March 31, 1931.  L. R. LUDWIG  1,798,690
PROTECTIVE SYSTEM
Filed Feb. 4, 1929
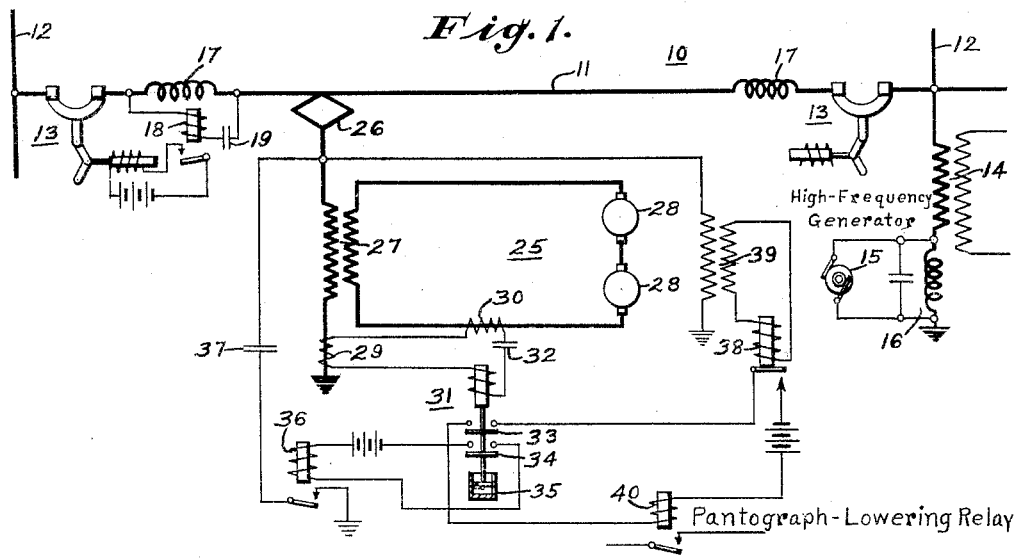
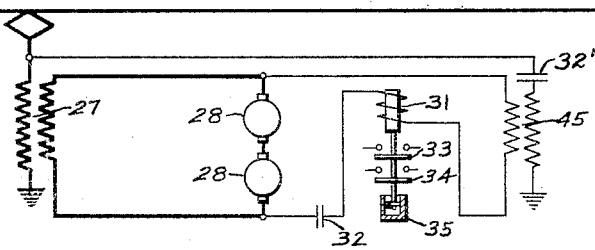
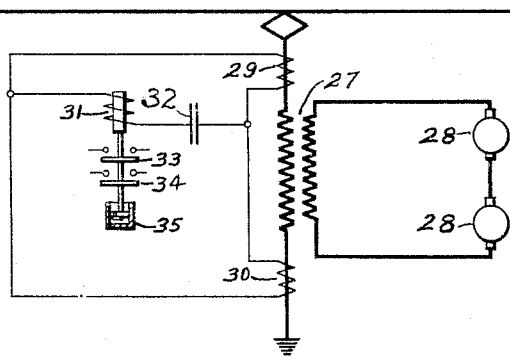
INVENTOR
Leon R. Ludwig
BY
*Wesley S. Carr*
ATTORNEY Patented Mar. 31, 1931

1,798,690

UNITED STATES PATENT OFFICE

LEON R. LUDWIG, OF WILKINSBURG, PENNSYLVANIA, ASSIGNOR TO WESTINGHOUSE ELECTRIC & MANUFACTURING COMPANY, A CORPORATION OF PENNSYLVANIA

PROTECTIVE SYSTEM

Application filed February 4, 1929. Serial No. 337,475.

This invention relates, in general, to protective systems and, in particular, to protective systems designed for application to railway distribution systems, although it is not limited to such application.

My invention finds its chief field of usefulness in connection with railway-distribution protective systems making use of a high-frequency current, superposed upon the main power conductors, for actuating high-frequency relays upon the occurrence of a fault on the distribution circuit.

Numerous modifications of high-frequency protective systems have been disclosed and, as an example, I refer to my copending application, Serial No. 227,462, filed October 20, 1927. In this application, a system is disclosed which includes means for supplying a high-frequency current to a distribution circuit, as well as high-frequency relays for isolating or disconnecting portions of the distribution circuit on the occurrence of faults therein.

It is the object of this invention to provide a protective system responsive to high-frequency currents, for the electrical equipment located in the locomotives or motor cars of the railway to which the high-frequency protective system of the application referred to above is applied.

One object of the invention is to provide means for causing the pantograph or trolley of the locomotive or motor car to be lowered, from its normal position engaging the contact line or trolley conductor, upon the occurrence of a fault in the transformer on the locomotive.

Another object of the invention is to provide means for preventing the operation of the pantograph-lowering device when the trolley conductor is deenergized by the opening of sectionalizing circuit breakers upon the occurrence of a line fault.

Other objects of this invention will appear more fully and at large in the course of the following description of my invention and the method of its operation.

In accordance with my invention, I propose to provide differential protection for the locomotive transformer according to well-known principles, such that a disturbance of the normal proportion of the high-frequency currents in the transformer windings will operate protective devices. In connection with this differential protection, I also provide means for grounding the trolley conductor at the high frequency only, to cause the circuit breakers at the ends of a section of the conductor to be opened so that the conductor will be deenergized. Additional means responsive to the voltage of the conductor or to the current flowing in the pantograph are provided to prevent the operation of the pantograph-lowering means until normal voltage has been removed from the trolley conductor or the fault current has been interrupted. The system of my invention operates under the circumstances described above to cause the lowering of the pantograph or trolley from its normal position in which it engages the trolley conductor, and therefore, provides complete protection for the transformer equipment carried upon the locomotive.

For a thorough undertsanding of my invention, reference may be made to the accompanying drawing in which Figure 1 is a diagrammatic representation of one embodiment of my invention; and Figs. 2 and 3 are modifications thereof.

Referring in detail to Fig. 1, a railway distribution circuit 10 includes a trolley conductor or contact line 11 adapted to be connected at its ends to substation busses 12 by circuit breakers 13. Energy is supplied to the trolley conductor from the substation busses by transformers 14 which, in turn, are connected to a high-voltage transmission circuit (not shown).

A high-frequency generator 15 is provided at one or more of the substations for supplying a control current to the distribution circuit. In accordance with the principles explained in my copending application referred to above, the high-frequency generator 15 is connected across a blocking shunt or low-pass filter 16 on the ground side of the low-voltage winding of the transformer 14.

An impedance device 17 is connected in the circuit of the trolley conductor 11 at one or more of the substations and, in parallel therewith, is connected a tuned circuit comprising a relay 18 and a condenser 19. The tuned circuit is responsive only to the flow of high-frequency current through the impedance device 17 and, when such condition exists, the relay 18 operates to close a tripping circuit for the circuit breaker 13.

As explained in my copending application, high-frequency current may be supplied to the conductor 11 at each substation in phase opposition so that, normally, no high-frequency current flows in the trolley conductor and the relay 18 remains deenergized. In order to simplify the showing of this application and because the protective system for the distribution circuit is not a part of the present invention, I have shown only a single high-frequency supply and a single relay circuit for isolating the conductor 11. It is to be understood, however, that similar protective devices and high-frequency generators are to be supplied at each of the substations or section points along the line of the conductor 11.

A locomotive or motor car adapted to derive energy from the conductor 11 is illustrated generally at 25. The locomotive includes a pantograph or trolley 26, a power transformer 27 for reducing the voltage of the conductor 11 to a value suitable for application to driving motors such as those illustrated at 28. Although these motors are illustrated as connected directly to the secondary winding of the transformer 27, it is obvious that any suitable type of starting or controlling equipment may be interposed between the motors and the transformer in any well-known manner.

Current transformers 29 and 30 are connected in the leads to the primary and secondary windings of the transformer 27 for controlling the operation of a differential relay 31. A condenser 32 is connected in the circuit of said relay in order to prevent the circulation of currents set up by the low-frequency power current supplied from the conductor 11 to the motors 28. It will be understood that the transformers 29 and 30 must be so designed that they will supply equal, opposed high-frequency currents from the source 15 to the relay 31, so long as the transformer 27 remains electrically sound, taking into consideration the difference in the voltages of the primary and secondary circuits.

When a fault occurs in the transformer 27, the high-frequency currents supplied to the relay 31 by the transformers 29 and 30 will be unequal as a result of the fact that the currents in the windings of the transformer 27 are no longer proportional. Any type of transformer fault will produce the condition described above, whether it is a winding-to-ground fault or a winding-to-winding failure. When the high-frequency currents induced in the current transformers 29 and 30 are unequal, the relay 31 will be energized by the difference between said currents and will operate to close its contacts 33 and 34.

It should be noted here that the relay 31 is provided with time-delay means such as a dash pot 35 or its equivalent, which permits the relay to close its contacts instantaneously, when energized, but prevents the opening of said contacts for a short time after the deenergization of the relay winding. The purpose of this construction will become apparent hereinafter.

When the relay 31 operates to close its contacts, 33 and 34, a circuit is completed through the contact 34 for an auxiliary relay 36 which, thereupon, closes its contact to complete a circuit from the pantograph 26 through an impedance such as the condenser 37 to ground. The condenser 37 is so designed that it will pass currents of high frequency, but will block currents of frequencies of the order of that of the power current. As a result, the distribution circuit 11 is grounded to the superposed high-frequency current but not to the power current.

When a ground return path is provided for the superposed high-frequency current supplied to the conductor 11 by the generator 15, the relays 18 at the substation 12 are energized in response to the flow of high-frequency current through the impedance devices 17, to close tripping circuits for the circuit breakers 13. When the circuit breakers 13 have opened, the conductor 11 is isolated from its sources of current such as the transformer 14. The supply of current to the transformer fault, therefore, is cut off. The winding of the relay 31, likewise, is deenergized, since the current transformers 29 and 30 no longer supply current thereto, but the relay 31 is maintained in its operated position by its time-delay mechanism.

A relay 38 is normally energized from the conductor 11 through a step-down transformer 39 and its contact in connection with the contact 33 of the relay 31, controls the circuit of a relay 40 which, in turn, controls the position of the pantograph 26. When the conductor 11 is deenergized because of the opening of the circuit breakers 13, the relay 38 is likewise deenergized and its contact completes a circuit for the relay 40.

The means by which the relay 40 controls the position of the pantograph 26 has not been illustrated since such means are well-known in the art and constitute no part of this invention. If the pantograph is maintained in contact with the conductor 11 by compressed air, the relay 40 may serve to release the pressure under the pantograph-lifting piston to permit the lowering of the pantograph. If the pantograph is spring-lifted, the relay 40 may control any operating mechanism for lowering the pantograph against the tension of the lifting spring.

It is obvious, from the foregoing description, that the system of my invention provides a means for isolating faulty apparatus on rolling stock from all sources of energy, to prevent serious damage to such equipment. It will also be apparent that the system of my invention permits the separation of the trolley from the contact conductor only after the latter has been deenergized by the opening of the sectionalizing circuit breakers. Another advantage of my invention resides in the fact that a temporary failure of voltage on conductor 11 resulting, for example, from a ground fault at some point along the conductor, will not cause the lowering of the pantograph since the latter operation requires that the differential relay 31, as well as the low-voltage relay 38, be actuated appropriately. Another advantage of this system is that no circuit breakers are required on the locomotive or motor car and still further advantage is that the tripping of the sectionalizing breakers is accomplished without grounding the contact conductor at the power frequency.

Although I have shown no means for reclosing the circuit breakers 13, such operation is within the scope of the invention described and claimed in my copending application referred to above and it is obvious, of course, that the same feature may be applied to a system such as that shown herein. By the use of reclosing equipment, normal voltage is restored to the contact conductor 11 within a very short time after the circuit breakers 13 first open and the supply of energy to locomotives other than that on which the transformer fault occurred is promptly restored.

Fig. 2 is a partial diagram of a modification of the system shown in Fig. 1. In the latter, the differential protection is obtained by balancing currents proportional to those in the windings of the power transformer on the locomotive. In Fig. 2, the same result is accomplished by balancing the voltages across the windings of the locomotive transformer, making appropriate allowance for the ratio of transformation. In Fig. 2, the locomotive transformer 27 is adapted to supply current to the motors 28 as explained in connection with Fig. 1. The relay 31, however, is connected across the secondary circuit of the transformer 27 in series with a blocking condenser 32, to prevent flow of power current, and the secondary winding of a step-down transformer 45, the primary of which is connected in series with a blocking condenser 32' between the conductor 11 and ground.

It will be apparent that the relay 31 is subjected to the voltage across the motors 28 or, in other words, to the voltage of the secondary winding of transformer 27. At the same time, a voltage proportional to that across the primary winding of the transformer 27 and in opposition to that across the secondary thereof is impressed upon the relay 31 through the transformer 45. As long as the transformer 27 operates normally, the voltages applied to the relay 51 are equal and opposed and the relay remains deenergized. Upon the occurrence of a transformer fault, the voltages across the windings thereof are no longer proportional to each other and a differential voltage is applied to the relay 31 to cause it to close its contacts. The operation of the relay 31 has the same effect as in the modification of Fig. 1 and a repetition of the description thereof is omitted.

Fig. 3 illustrates a further modification of the system of my invention in which the differential protection of the transformer 27 is accomplished by means of current transformers 29 and 30 which are connected in the high-tension and low-tension leads, respectively, to the primary winding of the transformer 27. In this modification, the high-frequency current supplied to the winding of the relay 31 by the transformers 29 and 30 are equal and opposite as long as the transformer 27 is normal. When the fault occurs in the transformer 27, however, the differential between the currents supplied by the transformers 29 and 30 is sufficient to operate the relay 31 with the same result as that accomplished by the system shown in Fig. 1. It is to be noted that the system of Fig. 3 affords protection only for faults occurring in the primary winding of the transformer 27. Since the majority of transformer faults occur in the high-tension winding, however, this fact appears to be no substantial objection to the system.

It is to be understood, furthermore, that it is within the contemplation of my invention to substitute power relays for the voltage and current relays employed in Figs. 1 to 3. Complete protection of the transformer may be obtained by balancing the power input to the transformer and the power output thereof and this balancing of input against output may be effected by the use of well known differential power relays.

An additional advantage obtained by the use of high-frequency currents for operating the protective relay 31 is that no account need be taken of the counter-electromotive force developed by the driving motors. This is true because the relay 31 responds only to high-frequency currents and the blocking condenser 32 prevents the low-frequency voltage from affecting the relay.

A particular advantage characteristic of the system shown in Fig. 3 is that it is independent of the transformation ratio of the transformer 27.

Since numerous changes and modifications in the systems shown herein will doubtless occur to those skilled in the art, it is not my intention to be limited to the embodiments described, but I desire that all such changes as fairly fall within the scope of the appended claims be considered as part of this invention.

I claim as my invention:

1. The combination with an electric locomotive, a motor for driving said locomotive, a source of current, a conductor for supplying current from said source to said motor, a pantograph for normally engaging said conductor and a transformer connected between said motor and pantograph, of a differential relay responsive to the difference between the currents passing through the windings of said transformer, an impedance device, means controlled by said relay for grounding said conductor through said impedance device, means responsive to the grounding of said conductor for isolating it from said source of current, and a relay actuated upon the de-energization of said conductor for cooperating with said differential relay to cause the separation of said pantograph from said conductor.

2. The combination with an electric vehicle, a motor for driving said vehicle, a normally energized conductor for supplying current through a trolley to said motor and a step-down transformer connected between said trolley and motor, of a differential relay energized upon the occurence of abnormal conditions in said transformer, means controlled by said relay for grounding said conductor, means energized by the grounding of said conductor for effecting the isolation thereof and a relay energized in accordance with the supply voltage on said conductor for effecting the removal of trolley from engagement with said conductor upon the failure of the conductor voltage.

3. A protective system for electric vehicles having a power transformer taking energy for driving motors from a normally energized conductor by means of a trolley, comprising means energized upon the occurrence of abnormal conditions in said transformer, a device energized upon the actuation of said means for causing the isolation of said conductor from its energy source, and means actuated upon the deenergization of said conductor for withdrawing said trolley from engagement therewith.

4. In a protective system for an electric vehicle having a power transformer adapted to draw energy from a conductor by means of a trolley and supply it to driving motors, means for disconnecting said trolley from said conductor, means actuated upon the occurrence of an abnormal condition in said transformer and means actuated upon the de-energization of said conductor for jointly controlling said first-mentioned means.

5. In an electric vehicle, a power transformer adapted to draw energy for driving motors from a normally energized conductor through a retractable trolley, a plurality of means severally actuated in accordance with abnormal transformer conditions and the voltage on said conductor for effecting the withdrawal of said trolley from engagement with said conductor.

6. A protective system for an electric vehicle having a transformer adapted to receive energy from a normally energized conductor through a trolley and to supply energy to driving motors, comprising means actuated severally in accordance with abnormal transformer conditions and the voltage on said conductor for jointly controlling said trolley.

7. In an electric vehicle, a power transformer associated with a normally energized conductor through a retractable pantograph, pantograph-lowering means energized by the sequential actuation of means energized in accordance with abnormal conditions in said transformer and means actuated upon the de-energization of said conductor.

8. In a protective system for an electric vehicle, the power transformer thereof being energized from a normally energized power conductor through a retractable pantograph, said power conductor having special-frequency currents superposed thereon, pantograph-lowering means energized by the sequential actuation of tuned means energized upon the occurrence of abnormal conditions in said transformer and means actuated upon the deenergization of said conductor.

In testimony whereof, I have hereunto subscribed my name this 31st day of January, 1929.

LEON R. LUDWIG.